United States Patent [19]
Brail

[11] 3,959,699
[45] May 25, 1976

[54] BI-DIRECTIONAL MOTOR DRIVE SYSTEM

[76] Inventor: Fred Brail, 6529 West Blvd., Inglewood, Calif. 90302

[22] Filed: Nov. 25, 1974

[21] Appl. No.: 526,549

Related U.S. Application Data
[63] Continuation of Ser. No. 366,419, June 4, 1973, abandoned.

[52] U.S. Cl. ............................ 318/45; 318/267; 318/487
[51] Int. Cl.² ..................................... H02P 5/46
[58] Field of Search .................. 318/8, 45, 48, 267, 318/62, 487

[56] References Cited
UNITED STATES PATENTS

| | | | |
|---|---|---|---|
| 2,698,394 | 12/1954 | Brown | 318/45 X |
| 2,787,747 | 4/1957 | Drummond | 318/45 |
| 2,800,619 | 7/1957 | Brunt | 318/45 |
| 2,992,378 | 7/1961 | Schneider | 318/267 |
| 2,995,634 | 4/1961 | Richmond | 318/267 X |
| 3,048,761 | 8/1962 | Purdy | 318/267 X |
| 3,181,049 | 4/1965 | Klamp | 318/267 |
| 3,199,857 | 8/1965 | Klamp | 318/267 X |
| 3,204,169 | 8/1965 | Ranson | 318/267 X |
| 3,561,520 | 2/1971 | Gill | 318/267 X |
| 3,771,032 | 11/1973 | Hender | 318/8 |

Primary Examiner—B. Dobeck
Attorney, Agent, or Firm—Henry M. Bissell

[57] ABSTRACT

Two electric motors are coupled to each other and to a device which is to be bi-directionally actuated. An associated electrical control circuit comprises switches and delay timers, for energizing the first motor to drive the device in one direction and concurrently drive the second unenergized motor, and then to energize the second motor to drive the device in another direction and concurrently drive the first unenergized motor.

10 Claims, 2 Drawing Figures

BI-DIRECTIONAL MOTOR DRIVE SYSTEM

CROSS-REFERENCE TO RELATED APPLICATION

This applicaton is a continuation of my copending application Ser. No. 366,419 filed June 4, 1973 for BI-DIRECTIONAL MOTOR DRIVE SYSTEM, now abandoned.

BACKGROUND OF THE INVENTION

Bi-directional actuation of a device between predetermined travel limits, as for example the opening and closing of a door or a gate, has been accomplished in the prior art by means of the single electric motor. This has been believed in the past by those skilled in the art to be the best and simplest means for accomplishing the actuation since an electric motor is readily reversible by reversing the connections of one of its windings to the power source while maintaining intact the connection of the other winding or windings.

Also, it is customary to provide a speed reducing transmission means disposed between the motor output shaft and the input shaft or actuating arm of the device to be actuated. Furthermore, there is usually a travel limit switch arrangement coupled to the transmission mechanism in order to provide a positive means for opening the circuit between the electrical power source and the motor at end limits of travel.

However, as can be seen, the requirement for reversal of motor windings can only be met by bringing out winding leads for the winding to be reversed, as well as the usual leads to the other winding or windings. Accordingly, the solenoid switches or relays which are usually provided for coupling the windings to the power source should be mounted in the immediate vicinity of the motor in order to reduce lead length as much as possible since there are always at least three leads from the switches to the motor which carry current during motor operation.

The prior art practice, as thus outlined briefly, has been found to be undesirable in at least two aspects. Firstly, there is a complexity of electrical power and control circuits which results in a high degree of unreliability. Secondly, the arrangement may require an overdesign of components, and especially so if repeated duty cycles of operation are required at closely spaced intervals. That is, if the actuation is that of a garage door, for example, which is subject to heavy in-and-out traffic over prolonged periods of time, the single motor of the actuator is operating constantly, or very nearly constantly on a near 100% duty cycle. In such a case the motor may heat up and acquire a heat soak if its horsepower or temperature rating is marginal to any extent. Thus, overdesign will call for a more expensive motor having at least a higher temperature rating, or in the alternative, a motor of higher horsepower.

Complexity of control circuit enters into the picture because of the winding reversal switching that is necessary. Furthermore, if the power switch means must be mounted remotely from the motor, the additional motor winding leads must be brought out of the motor and run to the remote switch box.

Thus, a single reversible electric motor for bidirectional operation presents problems of reliability of the motor, the leads and the switching circuit, all of which may be complicated by a further problem imposed by limit switches which may have to be bypassed by control switches when motor reversal is to be effected.

SUMMARY OF THE INVENTION

Accordingly it is a general object of the invention to overcome the problems of bi-directional actuators, and by so doing to increase the reliability of the components and reduce the complexity of the electrical circuit. It is a particular object to provide an actuator having one motor for each of the directions of actuation which thereby introduces a greatly reduced duty cycle factor. Furthermore, as is readily apparent to those skilled in the art, the motors can be sized for the load. Thus in the case of a gate, for example, it may be that the load for opening the gate is somewhat larger than that for closing. In that event, the motor for the closing direction could be sized at a lower horsepower rating than the motor for the opening direction. Additionally, advantage can be had if the speeds of operation of the gate are to be different for the two directions, and this is easily arrived at by different input speeds to the speed reducing transmission from the motors as will be explained in detail below.

It is a further object of the invention to provide means coupling the output shafts of the motors to each other, as well as to the input of the actuator load. In that event, the motor provided for the opening mode drives the idle closing mode motor as well as the load, and the motor for the closing mode drives the idle opening mode motor as well as the load. The reason for this is that the particular motor which is idle in the particular portion of the whole operating cycle is thereby provided with additional cooling effect since its rotor with integral fan is generating a cooling stream of air past the unenergized windings. By reason of this arrangement the temperatures are reduced much more than is the usual case, hence motors of greatly reduced temperature rating may be utilized. As can be seen, temperature soak problems arising from extended and closely spaced operational cycles are substantially eliminated.

It is a specific object of the invention to provide an arrangement in which the power supply and control circuits are greatly simplified whereby the reliability of the operation is greatly enhanced for much longer periods of time.

DESCRIPTION OF THE DRAWING

Other and further objects will be apparent to those skilled in the art upon consideration of the description of the invention hereinafter when taken in connection with the accompanying drawing wherein.

DESCRIPTION OF THE PREFERRED EMBODIMENT

Figure 1:
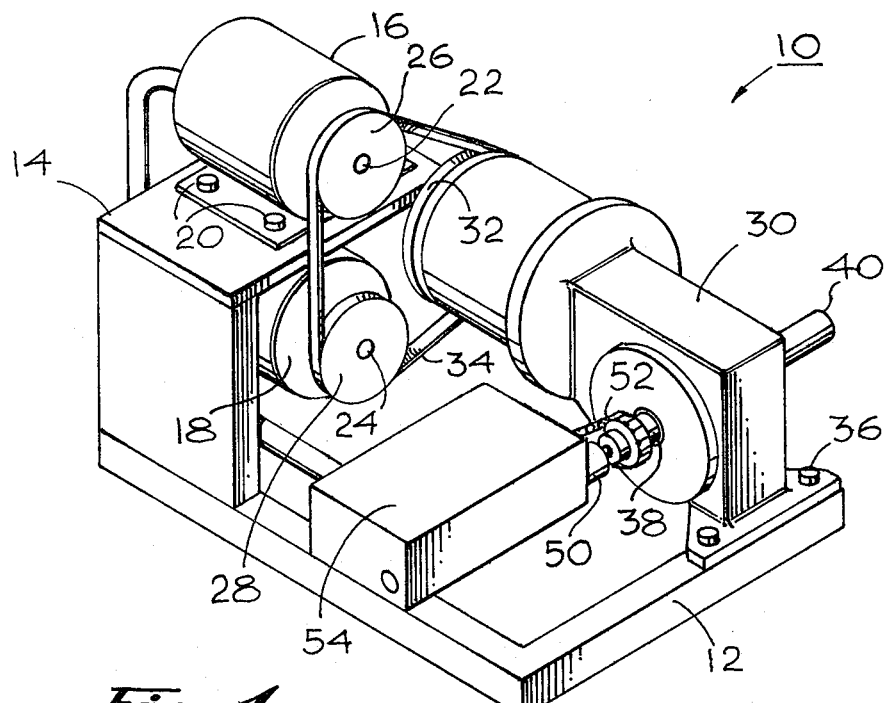
FIG. 1 is a perspective view of one embodiment of the invention.

Referring to FIG. 1, there is shown a bi-directional actuator 10 provided with a base 12 having an upwardly disposed sub-base 14 upon which are mounted the electric motors 16 and 18 by a plurality of bolts extending through the motor bases and the sub-base 14, two of the mounting bolts being shown at 20. With this arrangement the motors 16 and 18 have substantially a piggyback relationship with their respective output shafts 22 and 24 extending with parallel axes to the same side edge of sub-base 14.

Mounted on the shafts 22 and 24 are V-belt pulleys 26 and 28, respectively. In the usual case, the pulleys 26 and 28 would be of substantially equal size, although this is not an absolute requirement, as will be apparent.

Also mounted on the base 12 is a speed-reducing transmission means 30 of commonly-available type, having an input shaft (not shown) upon which is mounted a V-belt pulley 32 aligned with motor pulleys 26 and 28. A V-belt 34 is disposed around all said pulleys 26, 28 and 32 in driving relationship. With this arrangement, the motor 16, when energized, drives unenergized motor 18 and the transmission 30; and the motor 18, when energized, drives the unenergized motor 16 and the transmission 30. Thus the unenergized motor, in both cases, is provided with a stream of cooling air induced by the integral fan 17 or 19 on its shaft. The transmission 30, which is mounted on the base by a plurality of bolts, two of which are shown at 36, has an output shaft 38, one end 40 of which is adapted for coupling to a load to be actuated.

The load (not shown) coupled to the end 40 of the shaft 38 is adapted for movement bi-directionally between limits of travel. To this end the motor 16 operates in one direction; for example, clockwise as viewed from the pulley end, and the motor 18 operates in a reverse direction, counterclockwise for example, whereby the shaft 38 is driven first in one direction by one motor and then in the other by the other motor. Travel limit of the load is established by a pair of travel limit switches shown at 42 and 44 on FIG. 2. As shown by dotted lines 46 and 48, the switches 42 and 44 are mechanically coupled to the shaft 38 in conventional manner, as will be apparent to those skilled in the art. The coupling may take the form of mechanism partially shown on FIG. 1 as comprising a first sprocket 50 disposed on the shaft 38, and a chain 52. The chain 52 engages other mechanism not shown, including a second sprocket on a sub-shaft journalled in bearings supported by a junction box 54, all as will be readily understood to be common practice in the art. The sub-shaft may have a cam or cams thereon to actuate the limit switches disposed within the box 54, or may have a threaded member upon which a travelling nut is disposed to move back and forth between the limit switches. The practice is well-known and need not be detailed here since it forms no part of the inventive concept.

The junction box 54, in addition to containing the limit switches 42 and 44 and their actuating mechanism, also serves as a terminal point into which is brought the winding leads from the motors and the power source leads. Box 54 also contains the electrical components shown on FIG. 2 other than exterior control switching means described hereinbelow.

Figure 2:
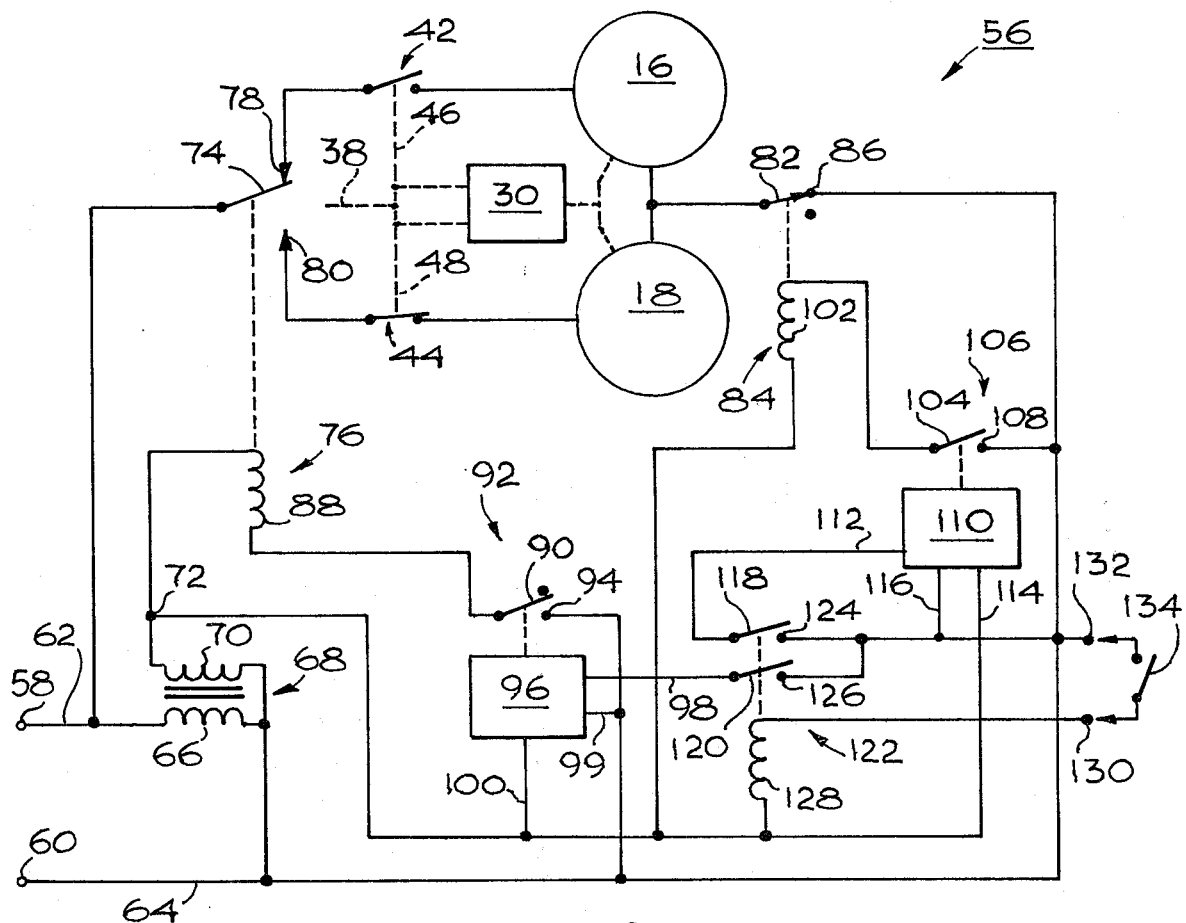
FIG. 2 is a schematic wiring diagram of the electrical control circuit employed in the embodiment of FIG. 1.

As shown on FIG. 2 an electrical circuit 56 has electric power input terminals 58 and 60 arranged for coupling to a power source. Power supply conductors 62 and 64 extend from the respective terminals 58 and 60 with the primary 66 of a transformer 68 coupled thereto. The secondary 70 of the transformer has one side coupled to the conductor 64 and the other side to a low voltage terminal point 72. With this arrangement the conductor 64 is common to both the power supply voltage and the control circuit lower voltage. Conductor 62 is also coupled to the switch arm 74 of a relay 76, with fixed relay contacts 78 and 80 being coupled respectively through the limit switches 42 and 44 each to one side of the motors 16 and 18. The other sides of the motors are coupled to the switch arms 82 of a relay 84 whose normally-closed fixed contact 86 is coupled to the common conductor 64.

The relay 76 has a field coil 88, one side of which is coupled to the lower voltage supply terminal 72 and the other side to the switch arm 90 of a switching mechanism 92 whose normally-open contact 94 is coupled to the common voltage supply conductor 64. The switch 92 is adapted for operation by a delay timing device indicated by the block 96 which has control circuit inputs via input conductors 98, 99 and 100, the latter of which is coupled to the low voltage supply terminal 72. Conductor 99 is coupled to the common voltage supply conductor 64.

The relay 84 has a field coil 102, one side of which is coupled with the conductor 100 to the low voltage supply terminal 72 and the other side to the switch arm 104 of a switching mechanism 106 whose normally-open contact 108 is coupled to the common conductor 64. The switch 106 is adapted for operation by a delay timing device indicated by the block 110 which has control circuit inputs via input conductors 112, 114 and 116. Conductor 114 is coupled to the low voltage terminal 72.

Conductors 98 and 112 are coupled to the respective switch arms 118 and 120 of a relay 122 whose fixed normally-open contacts 124 and 126 are coupled in common fashion with the conductor 116 of device 110 to the common voltage supply conductor 64. The relay 122 is provided with an actuating field coil 128 having one side coupled to the low voltage supply terminal 72 and the other side to a control circuit terminal 130, another control circuit terminal 132 being coupled to the common voltage supply conductor 64.

The control circuit components of the electrical circuit 56 including the transformer 68, the relays 76, 84 and 122, the delay timing devices 96 and 110, and the control circuit input terminals 130 and 132 are contained in the junction box 54 of FIG. 1, along with limit switches 42 and 44.

Closure of the control circuit terminals 130 and 132, as for example by a simple push button or other momentary circuit closing means, shown as a normally open switch 134, initiates a sequence of operations as follows.

The field coil 128 of relay 122 is energized by its said other side being momentarily coupled to the common conductor 64. This effects instant momentary closure of the normally-open contacts 124 and 126 by the arms 118 and 120 to couple the common conductor 64 to the delay devices 96 and 110 via their respective circuit input conductors 98 and 112. Delay device 110 thereupon closes the switch mechanism 106 instantly to energize the field coil 102 of relay 84 which thereupon opens the normally-closed switch contact 86. This condition exists for only a short period of time, preferably of the order of two seconds, for a purpose to be explained below.

As will be seen, the delay period may extend beyond the time of momentary closure of the switch 134. However, the conductors 114 and 116 supply whatever low voltage power is necessary to the delay device 110 for any required continued function after control voltage through the conductor 112 is interrupted by subsequent opening of the switch contact 124. In any event, at the end of the short delay timing period, the device 110 opens the contact 108 which interrupts current to the field of the relay 84 permitting the switch contact 86 to be closed by the arm 82 and thus restoring the power circuit from conductor 64 to one side of both the motors 16 and 18.

The momentary energization of the delay device 96 also effects two operations, to wit the closure of the switch mechanism 92 and the start of an extended operational delay period of time for maintenance of the closure condition of the switch 92, preferably of the order of fifteen seconds as will be explained below. Again it will be noted that the momentary control signal to device 96 from its input conductor 98 would, upon interruption, remove control voltage for any necessary continued control function of the device 96. Hence the conductor 99 supplies the necessary power during the delay period.

The closure of the switch mechanism 92 by the device 96 thereby couples the said other side of the relay field coil 88 of the relay 76 to the common voltage supply conductor 64 by closure of the switch contact 94. Thereupon relay 76 pulls in to move switch arm 74 from fixed contact 78 to contact 80 for the duration of the delay period controlled by the device 96.

It should be noted that in the operation of the actuator 10 the normal condition of apparatus is that at which it is homed at one end of travel limit, in which event the limit switch in the circuit of the motor which brought the load to home position is open. In the case of a door for vehicular access, for example, the door is homed in a closed condition and it is assumed for the purposes disclosed herein that the motor 16 is the motor which brings the load home (i.e., the motor which closes the vehicular access door), in which event the limit switch 42 is opened by the transmission 30 at that point of operation. It will be appreciated, of course, that the switches 42 and 44 are not necessarily required to be located in the box 54 for actuation by the transmission 30, but may be located at the end points of load movement if desired.

Returning now to the control circuit 56 on FIG. 2, the closure of switch contact 80 by the switch arm 74 applies full power voltage through the closed limit switch 44 to the motor 18 when the circuit is completed through the switch arm 82 and contact 86 after the short delay as aforesaid, and the motor 18 is energized to move the load from its homed position to its away or fully extended position, at which point the switch 44 is opened and motor 18 is deenergized. It will be noted that immediately after the start of load movement the travel limit switch 42 closes to establish the standby ready condition of the circuit to motor 16.

At the end of the delay period of the device 96, the switch 90 is opened which deenergizes the relay 76 to open the circuit at contact 80 and close the circuit at contact 78. Since the travel limit switch 42 has been closed as aforesaid, the motor 16 is now energized to bring the load home at which point the travel limit switch 42 is opened to deenergize the motor 16. When the homing movement is started the limit switch 44 closes to place the power circuit to the motor 18 in standby ready condition.

As was said, the delay device 110 provides a short delay, whenever the control circuit terminals 130 and 132 are closed, by opening the motor power circuit at switch contact 86. This is desirable in many cases where a load movement reversal is to be effected intermediate the limits of load travel. For example in the case of a vehicular access door which is in the closing mode after the entry or departure of a vehicle therethrough, it may be desirable to stop the closing movement and cause an opening movement to be executed in the shortest period of time without overloading the actuating components. Such an overload can arise if a reverse torque is applied before the forward movement has stopped. Thus it is desirable to permit the moving parts to come to rest before the reverse movement is initiated. The period of delay time, it should be noted, should be the least possible in order that valuable truck driver and helper time is not wasted while waiting for unnecessary time spacing of mechanical functions.

In that respect, mention was made above regarding differently sized motors for the two operations. Thus, where high-priced labor is a factor, it may be desirable to effect a door opening procedure in expedited fashion, after which closing may be executed in a more leisurely fashion by a motor of lower horsepower or temperature rating than that required for the rapid opening.

As stated above, a fifteen second delay is occasioned between the initiating of the first movement away, or opening mode, and the start of the second movement home, or closing mode. This period of time has been found to be a substantially effective period of time in cases of vehicular access doors. That is, it is sufficient time to permit vehicle entry after the vehicle has actuated the treadle switch or the driver has inserted his key at the key station in front of the door.

The delay time devices 96 and 110 have not been described in detail since this would serve no purpose other than to obscure the inventive concept offered herein. Those skilled in the art will instantly recognize the delay circuit requirements, usually involving fixed or adjustable R/C time constant circuit elements, which control the function of a solid state current control device, and will acknowledge that such circuits are well within the capabilities of those skilled in the art.

Although there has been described above a specific arrangement of a bi-directional motor drive system in accordance with the invention for the purpose of illustrating the manner in which the invention may be used to advantage, it will be appreciated that the invention is not limited thereto. Accordingly, any and all modification, variations or equivalent arrangements which may occur to those skilled in the art should be considered to be within the scope of the invention.

What is claimed is:

1. Electrical actuation apparatus for selectively driving a device between a first, temporarily-occupied position and a second, home position comprising:
   A. a first electric motor for driving the device to said first position and a second electric motor for driving the device to said second position;
   B. transmission means coupling said motors mechanically to each other and to the device whereby each motor, when energized, drives both the other motor and said device to the corresponding selected position;
   C. power circuit means for coupling said motors to a source of electrical power; and
   D. a start switch and control means in said circuit means including
      1. means for selectively energizing only one of said motors by said circuit means at any given time and 2. first delay means for both interrupting the energization of the second motor upon the activation of the start switch and thereafter delaying the energization of the first motor by an interval selected to permit the motors and transmission means to come to rest.

2. The apparatus of claim 1 wherein the control means further includes second delay means controlled by the start switch for initiating energization of the second motor at the end of a predetermined interval following closure of the start switch, which last-mentioned interval is selected to permit the device to travel to its first position and remain there for a time period sufficient to permit an operator to pass the home position of the device.

3. The apparatus of claim 2 wherein said second delay means has its delay interval reinitiated by each closure of the start switch.

4. The apparatus of claim 2 including a relay switch for momentarily energizing both delay means and initiating the delay intervals thereof in response to a single closure of the start switch.

5. The apparatus of claim 1 in which said transmission means comprises a belt drive coupling pulleys on the output shafts of said motors and said device.

6. Apparatus of claim 1 wherein each of said motors includes blower means for cooling said motor, said transmission means and said energized motor acting to drive the blower means of the unenergized motor to provide additional cooling thereof.

7. The apparatus of claim 2 in which the second delay means comprises timing switch means for providing a delay of a predetermined time interval for the transfer of the electrical circuit energization from said first motor to said second motor.

8. Apparatus of claim 1 wherein said delay means is set to establish a delay interval of not less than the time required for the motors and transmission to reach a rest condition following interruption of energization of the second motor.

9. The apparatus of claim 1 wherein the power circuit coupling means comprises:
 a first circuit connection common to both of said motors and a pair of second circuit connections respectively individual to the two motors;
 a relay switch in series with said first circuit connection and for interrupting power applied to one side of said motors in common; and
 another relay switch connected in circuit with both of said second motor connections for alternatively applying power to the other side of only one of said motors at a time.

10. The apparatus of claim 9 wherein each second circuit connection includes a limit switch responsive to the position of the device driven by said motors for opening the circuit connection of an energized motor upon said device reaching the limit of travel in the direction of drive by the energized motor.

* * * * *